Patented Aug. 8, 1950

2,517,536

UNITED STATES PATENT OFFICE 2,517,536

STABILIZATION OF ORGANO-SILOXANES

Joseph A. Chenicek, Riverside, Ill., assignor to Universal Oil Products Company, Chicago, Ill., a corporation of Delaware No Drawing. Application June 28, 1946, Serial No. 680,065

6 Claims. (Cl. 260—448.2)

This invention relates to the stabilization of organo-siloxanes and more particularly to the use of a novel inhibitor to prevent the oxidative deterioration of organo-siloxanes during storage and use, and particularly when exposed to heat and air.

Organo-siloxanes comprise essentially silicon atoms connected to each other by means of oxygen through silicon-oxygen linkages as shown below:

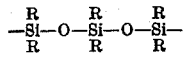

where at least some of the "R" groups are hydrocarbon radicals.

Organo-siloxanes may be prepared by the hydrolysis of a hydrolyzable organo-monosilane followed by partial or complete condensation of the hydrolysis product. They also may be prepared by hydrolyzing and condensing mixtures of different hydrolyzable organo-monosilanes. The organo-siloxanes may be liquid or solid, depending upon the extent of condensation. Liquid organo-siloxanes, when exposed to heat and air for prolonged periods of time, become more viscous and resinous. Solid organo-siloxanes become brittle when exposed to heat and air.

In one embodiment the present invention relates to a method of stabilizing an organo-siloxane which comprises incorporating therein a small but effective amount of an inhibitor comprising a substituted phenol, the substituent being selected from the group consisting of hydrocarbon, alkoxy and aryloxy radicals.

In a specific embodiment the present invention relates to a novel composition of matter comprising a liquid organo-siloxane containing about 0.01% to about 5% by weight of 2,4-dimethyl-6-tert-butyl phenol.

In another specific embodiment the present invention relates to a novel composition of matter comprising a liquid organo-siloxane containing about 0.01% to about 5% by weight of 2-tert-butyl-4-methoxy phenol.

As hereinbefore set forth, the inhibitor of the present invention comprises a substituted phenol, the substituent being selected from the group consisting of hydrocarbon, alkoxy and aryloxy radicals. The term "phenol" as used in the present specification and claims is limited to hydroxy monocylic aromatic hydrocarbon or, stated otherwise, hydroxy benzene.

The inhibitor will have the general structure indicated below:

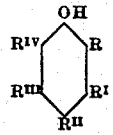

where the substituent groups indicated by R to $R^{IV}$ are selected from the groups consisting of hydrogen, alkyl, aralkyl, aryl, alkaryl, alkoxy and aryloxy radicals. At least one of the substituent groups must be a hydrocarbon, alkoxy or aryloxy radical, and the other substituent groups may be hydrogen. In general it may be stated that preferred compounds comprise those in which R, $R^{II}$ and/or $R^{IV}$ are alkyl groups and more specifically branched chain alkyl groups, while all or a portion of the remaining substituent groups may comprise hydrogen. If the substituent group comprises an alkoxy or aryloxy radical, the substituent preferably is in the position para to the hydroxyl group, as indicated by the position $R^{II}$ in the above structure.

When one or more of the substituent groups are hydrocarbon radicals, they may be alkyl, aralkyl, alkaryl and/or aryl as hereinbefore set forth. When "R" comprises an alkyl group and the other groups are hydrogen, the inhibitor includes such compounds as ortho-methyl phenol, ortho-ethyl phenol, ortho-isopropyl phenol, ortho-sec-butyl phenol, ortho-iso-butyl phenol, ortho-tert-butyl phenol, ortho-amyl phenols, etc., and corresponding meta or para-substituted phenols. As hereinbefore set forth, it is preferred that "R" is a branched chain alkyl group including particularly iso-propyl, tert-butyl and tert-amyl radicals.

Some of the preferred inhibitors of the present invention comprise di-and tri-alkyl substituted phenols, the substituent groups preferably being in the 2 and also in the 4 and/or 6 positions, including such compounds as 2,4-di-iso-propyl phenol, 2,4-di-sec-butyl phenol, 2,4-di-iso-butyl phenol, 2,4-di-tert-butyl phenol, similar isomers of amyl radicals, etc., 2-tert-butyl-4-methyl phenol, 2-tert-butyl-4-ethyl phenol, 2-tert-butyl-4-propyl phenol, 2-tert-amyl-4-methyl phenol, 2-tert-amyl-4-ethyl phenol, etc. and 2,4-di-methyl-6-tert-butyl phenol, 2-methyl-4-ethyl-6-tert-butyl phenol, 2-methyl-4-propyl-6-tert-butyl phenol, 2,4,6-tri-methyl phenol, 2,4,6-tri-ethyl phenol, 2,4,6-tri-propyl phenol, 2,4,6-tri-sec-butyl phenol, 2,4,6-tri-tert-butyl phenol, 2,4,6-tri-tert-amyl phenol, etc. 2,6-di-tert-butyl- 4-methyl phenol, 2,6-di-tert-butyl-4-ethyl phenol, etc.

Where the substituent group is an aralkyl radical, the inhibitor will comprise such compounds as 2-(phenyl methyl) phenol, 2-(beta phenyl ethyl) phenol, 2-(beta phenyl propyl) phenol, 2-(gamma phenyl propyl) phenol, 2-(beta phenyl butyl) phenol, 2-(gamma phenyl butyl) phenol, 2-(delta-phenyl butyl) phenol, etc., 3-(phenyl methyl) phenol, 3-(beta phenyl ethyl) phenol, 3-(gamma phenyl butyl) phenol, etc., 4-(phenyl methyl) phenol, 4-(beta phenyl ethyl) phenol, etc. It is understood that various additional hydrocarbon substituent groups may be attached to either of the rings.

When the substituent group comprises an aryl group the inhibitor will include such compounds as 2-phenyl phenol, 3-phenyl phenol, 4-phenyl phenol, which again may include additional hydrocarbon groups attached to either of the rings.

When the substituent group comprises an alkaryl radical, the inhibitor will include such compounds 2-(4-methyl phenyl) phenol, 2-(4-ethyl phenyl) phenol, 2-(4-propyl phenyl) phenol, 2-(4-butyl phenyl) phenol, 2-(4-amyl phenyl) phenol, etc., 3-(4-methyl phenyl) phenol, 3-(4-ethyl phenyl) phenol, 3-(4-propyl phenyl) phenol, 3-(4-butyl phenyl) phenol, 3-(4-amyl phenyl) phenol, etc., 4-(4-methyl phenyl) phenol, 4-(4-ethyl phenyl) phenol, 4-(4-propyl phenyl) phenol, 4-(4-butyl phenyl) phenol, 4-(4-amyl phenyl) phenol, etc., 2-(3-methyl phenyl) phenol, 2-(3-ethyl phenyl) phenol, 2-(3-propyl phenyl) phenol, 2-(3-butyl phenyl) phenol, 2-(3-amyl phenyl) phenol, etc., 2-(2-methyl phenyl) phenol, 2-(2-ethyl phenyl) phenol, 2-(2-propyl phenyl) phenol, 2-(2-butyl phenyl) phenol, 2-(2-amyl phenyl) phenol, etc.

When at least one of the substituent groups comprises an alkoxy radical, the alkoxy radical is preferably in the position indicated at $R^{II}$ in the above structure and will include such compounds as 4-methoxy phenol, 4-ethoxy phenol, 4-propoxy phenol, 4-butoxy phenol, etc.; di-alkoxy phenols include such compounds as 2,4-dimethoxy phenol, 2,4-diethoxy phenol, 2,4-di-propoxy phenol, etc., 2-methoxy-4-propoxy phenol, 2-propoxy-4-methoxy phenol, 2-butoxy-4-methoxy phenol, 2-butoxy, 2-butoxy-4-ethoxy phenol, etc. Particularly preferred compounds of this class include those containing both an alkoxy and alkyl substituent and include such compounds as 2-tert-butyl-4-methoxy phenol, 2-tert-butyl-4-ethoxy phenol, 2-tert-butyl-4-propoxy phenol, 2-tert-amyl-4-methoxy phenol, 2-tert-amyl-4-ethoxy phenol, 2-tert-amyl-4-propoxy phenol etc., 2,5-di-tert-butyl-4-methoxy phenol, 2,5-di-tert-butyl-4-ethoxy phenol, 2,5-di-tert-butyl-4-propoxy phenol, etc.

When at least one of the substituent groups is an aryloxy radical, the inhibitor will include such compounds as 2-phenoxy phenol, 3-phenoxy phenol, 4-phenoxy phenol, 2-tert-butyl-4-phenoxy phenol, 2,5-di-tert-butyl-4-phenoxy phenol, etc. Di-aryloxy substituted phenols include 2,4-di-phenoxy phenols, 2,4-di-phenoxy-6-tert-butyl phenol, etc.

It is understood that the various compounds hereinbefore set forth are merely representative of the class of inhibitors which may be used in the present invention, and that these various compounds are not necessarily equivalent. The choice as to the particular compound to use in any given instance will depend upon availability, cost and similar matters.

The inhibitor may be added to organo-siloxane in any suitable manner. In general, the maximum effectiveness of the inhibitor will be obtained by adding the inhibitor to the organo-siloxane and then heating the mixture to an elevated temperature. The exact temperature to be used will depend upon the particular inhibitor and organo-siloxane employed.

I claim as my invention:

1. A method of stabilizing a liquid organo-siloxane which comprises adding thereto about 0.01% to about 5% by weight of a 2-alkyl-4-alkoxy phenol.

2. The process of claim 1 further characterized in that said phenol is 2-tert-butyl-4-methoxy phenol.

3. A liquid organo-siloxane stabilized against deterioration containing about 0.01% to about 5% by weight of 2-tert-butyl-4-methoxy phenol.

4. A method of stabilizing a liquid organo-siloxane which comprises incorporating therein a stabilizing amount of a 2-alkyl-4-alkoxy phenol.

5. A composition of matter comprising a liquid organo-siloxane and a minor proportion of a 2-alkyl-4-alkoxy phenol.

6. A composition of matter comprising a liquid organo-siloxane and from about 0.01% to about 5% by weight of a 2-alkyl-4-alkoxy phenol.

JOSEPH A. CHENICEK.

REFERENCES CITED

The following references are of record in the file of this patent:

UNITED STATES PATENTS

| Number | Name | Date |
|---|---|---|
| 2,258,218 | Rochow | Oct. 7, 1941 |
| 2,258,222 | Rochow | Oct. 7, 1941 |
| 2,389,804 | McGregor et al. | Nov. 27, 1945 |
| 2,389,806 | McGregor et al. | Nov. 27, 1945 |